United States Patent [19]
Johnson

[11] 3,995,411
[45] Dec. 7, 1976

[54] OSCILLATING MOUNTING SUPPORT FOR AGRICULTURAL INSTRUMENT

[75] Inventor: Rodney J. Johnson, Owatonna, Minn.

[73] Assignee: Owatonna Manufacturing Company, Inc., Owatonna, Minn.

[22] Filed: May 16, 1975

[21] Appl. No.: 578,101

[52] U.S. Cl. .................... 56/15.8; 56/11.9; 172/457; 172/315
[51] Int. Cl.² ............... A01D 35/12; A01D 75/28; A01D 75/22
[58] Field of Search ............ 56/15.8, 11.9; 172/99, 172/457, 450, 315

[56] References Cited
UNITED STATES PATENTS

| | | | |
|---|---|---|---|
| 2,764,077 | 9/1956 | Pertics et al. | 172/99 X |
| 3,363,407 | 1/1968 | Drummond | 56/15.8 |

*Primary Examiner*—George J. Marlo
*Attorney, Agent, or Firm*—Schroeder Siegfried Ryan & Vidas

[57] ABSTRACT

A four point mounting system for a header type implement mounted on a support vehicle or tractor in which the lower support or push arms are solid and of a greater length than of the upper arms which are telescopic and provided with knuckle joints or dual pivot couplings on either end of the telescopic parts connecting the tractor and the vehicle. This provides for a greater range of oscillation of the implement relative to the support vehicle for traversing uneven terrain.

7 Claims, 6 Drawing Figures

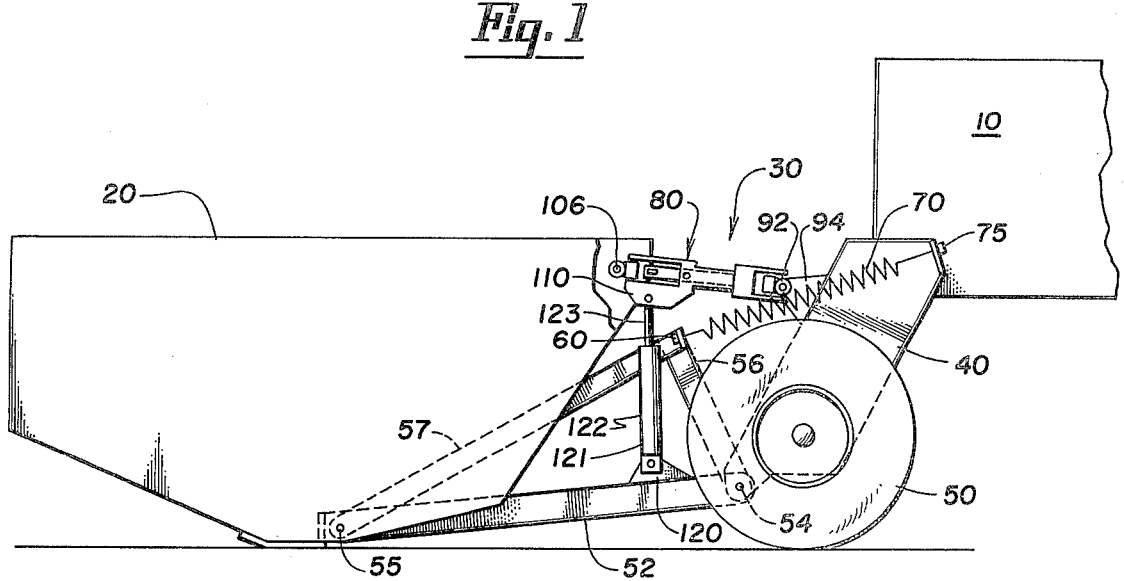
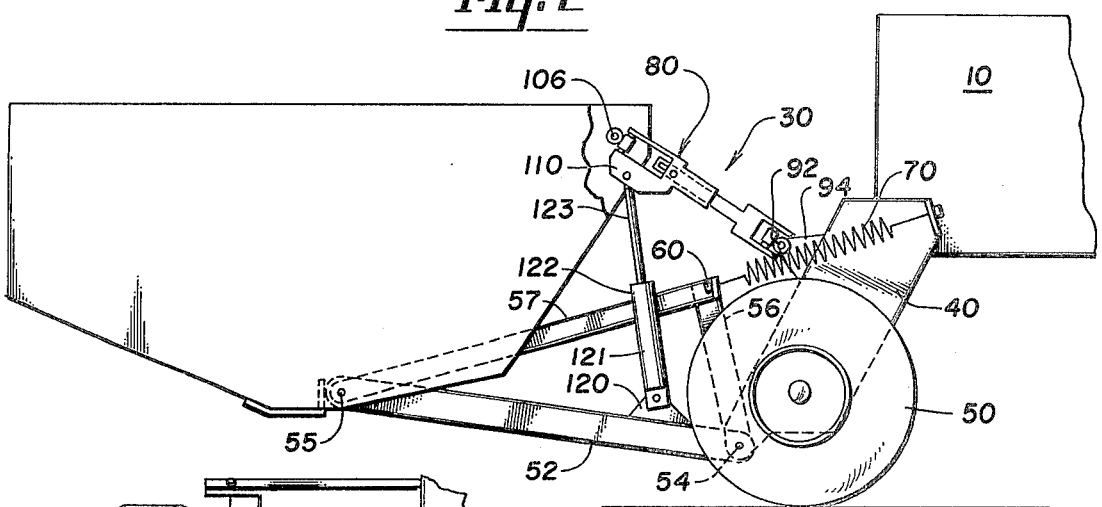
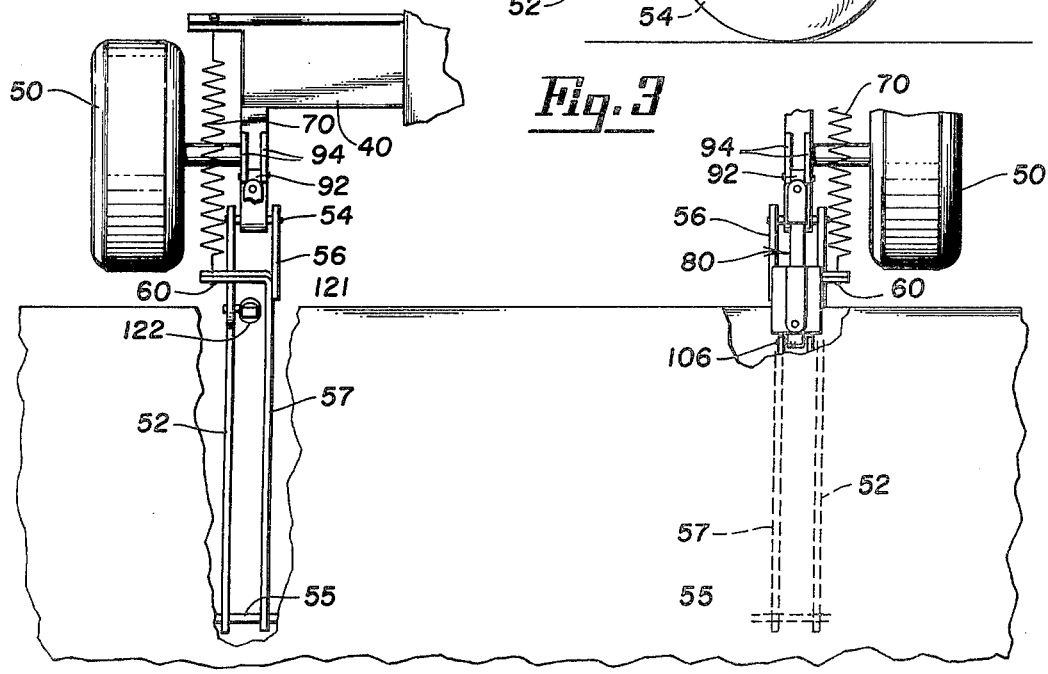

OSCILLATING MOUNTING SUPPORT FOR AGRICULTURAL INSTRUMENT

This invention relates to a mounting support for an implement and more particularly to an improved mounting support for an implement to be carried on the front or back end of the tractor and which permits oscillation of the implement relative to the tractor to better follow ground contour under working conditions.

Generally, agricultural implements, such as windrowers, are mounted on and carried by a tractor at the forward end of the same. Such implements are normally mounted on the tractor support or drive vehicle through solid connecting links of fixed lengths which pivot the implement relative to the tractor and maintain the implement in a balanced working position through the use of tension springs. Such a construction, while permitting limited oscillation or pivoting of the implement relative to the vehicle, creates an internal strain on the implement as it attempts to following varying ground contours under working conditions to uneven terrain.

The present invention is directed to an improved mounting support which permits greater oscillation of the implement relative to the support and drive vehicle under conditions of uneven terrain. It incorporates a pair of fixed length pivot arms as lower support members pivotally connecting the implement and the tractor at the lower point and a pair of telescopic arms pivotally connecting the drive vehicle and the implement at the upper portion of the support with the telescopic arms including knuckle joints or dual pivot axes, one axis being normal to the pivot axis to permit horizontal displacement of the arms such that one edge of the implement may be lifted relative to the other when uneven terrain is encountered. The implement is suspended relative to the drive vehicle by means of tension springs on either side of the implement and hydraulic actuators raise the implement relative to the drive vehicle for transport purposes. The telescopic upper support arms adjust in length to extend or retract as one edge of the vehicle is moved relative to the other and the additional pivot axis at each end of the upper arms is in a generally vertical plane normal to the horizontal pivot axis of the implement arms.

It is therefore an object of this invention to provide an improved mounting support for an implement, such as a windrower, carried by the front end of a drive vehicle.

Another object of this invention is to provide an improved mounting support of this type giving greater oscillation through the use of a pair of lower fixed length pivot arms and a pair of upper adjustable length pivot arms which are pivotally connected to the vehicle and the implement through a pair of pivot axes.

A further object of this invention is to provide in an improved mounting support a pair of telescopic support arms with a pair of pivot members normal to one another at each end of the same for coupling the implement to a drive vehicle for greater oscillation and to permit tilting of the implement relative to the vehicle on either side of the implement.

A still further object of this invention is to provide an improved mounting system for an implement which permits greater oscillation of the implement relative to the drive vehicle and movement between working and transport positions through the use of a pair of hydraulic actuators included in the mounting support.

These and other objects of the invention will become apparent from the reading of the attached description together with the drawings wherein:

FIG. 1 is a schematic side elevation view of the implement mounted on a vehicle through the improved mounting system in a working position;

FIG. 2 is a schematic side elevation view similar to FIG. 1 showing the implement in a raised transport position;

FIG. 3 is a schematic top view of the mounting system showing one top mounting arm extended and the other retracted to indirect tilting of the implement relative to the vehicle;

Figure 4:
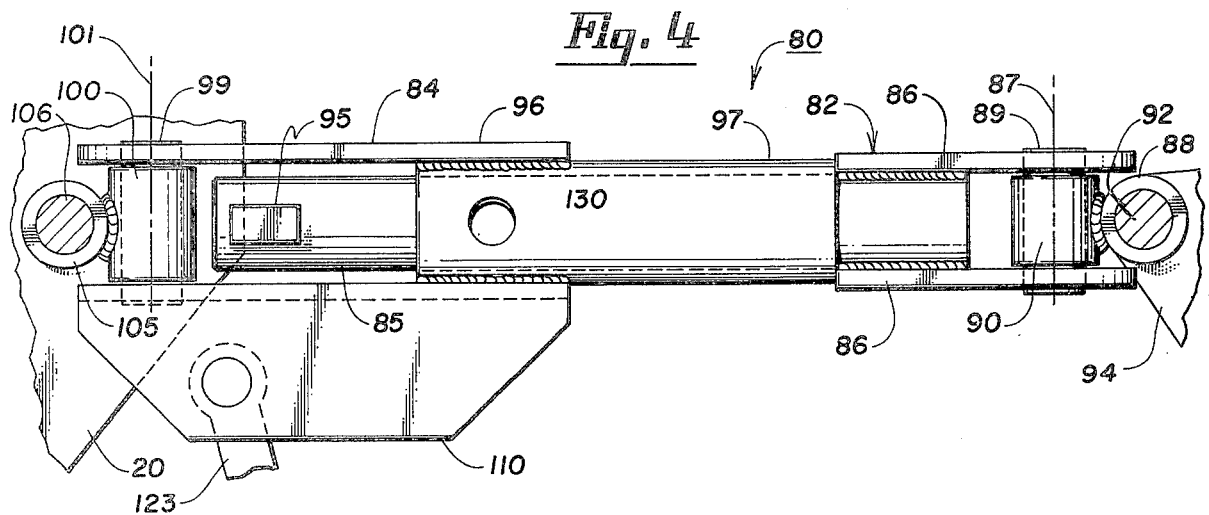
FIG. 4 is a side elevation view of an upper implement support arm.

In the drawings, I have shown the improved implement mounting support in connection with the schematic disclosure of the front end of the support vehicle indicated generally at 10. This vehicle or tractor may take varying forms and hence, its details are omitted for simplicity. Primarily, the support vehicle provides the drive or motive force for the implement and the mounting for the same which will be carried by the front end of the vehicle or tractor in both working and transport relationship. Similarly, the implement in FIGS. 1 and 2 is shown in block form at 20 since its details may vary, and such details form no part of the present invention. Generally, such an implement is a windrower combining a sickle structure together with suitable crop gathering and conditioning apparatus which move the severed crop to a particular position and deposit it behind the implement in a windrow. Such an implement would be supported by the drive vehicle and any power supply or drive from the drive vehicle, omitted in the drawings, would be coupled between the support vehicle or tractor in a drive coupling apart from the implement mounting support.

The mounting support or system is indicated generally at 30 in FIGS. 1 and 2. Depending upon the type of vehicle, the mounting support or support system will be attached to the tractor or vehicle either at the frame portion mounting the front drive wheels of the tractor or to the front end of the frame of the tractor. Thus, in FIGS. 1 and 2, the mounting support is shown attached basically to the flange members 40 of the tractor mounting the drive wheels 50 thereof. The support system includes a pair of lower push arms 52 which are pivotally connected to the tractor wheel frame, as at 54, through horizontal pivot members on the inside of the drive wheels and slightly spaced therefrom. The opposite ends of the lower push arms are pivotally connected to the implement 20 at a lower most portion thereof, as indicated at 55, through a pivotal connection comprising a horizontal pivot axis. This pivot point will be at or near the center of gravity of the head or implement depending upon the tilt of the same. The lower push arms include a first upstanding strap member 56 extending from the pivot point 54 on the tractor wheel mounting flange and a second mounting strap 57 extending from the pivot point 55 on the implement with the free ends of the strap members, 56, 57 being connected together and serving as a mounting support, as at 60, for one end of a tension spring 70. The opposite end of the spring 70 is connected to the wheel mounting flange of the tractor as at 75. Each of the lower push arms are identical in construction and extend from the mounting flanges 40 inside of the drive wheels of the tractor parallel to one another and in line with the extent of the tractor frame to be connected to the implement at points intermediate the outer edges thereof, since the implement will have a width normally greater than the spacing between the drive wheels of the tractor.

Figure 5:
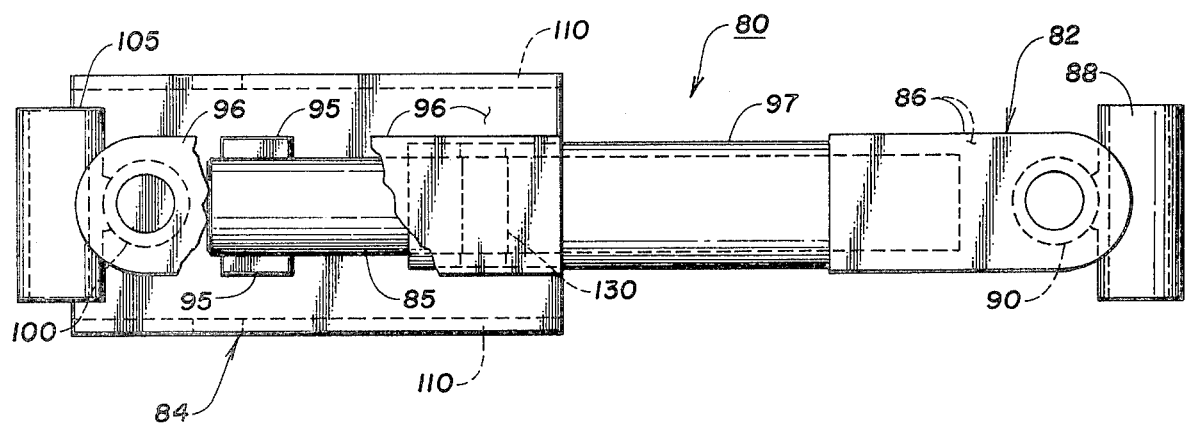
FIG. 5 is a plan view of the support arm of FIG. 4.

The linkage or mounting support includes a pair of upper link arms 80 which are shown in detail in FIGS. 4 and 5. As will be seen in these figures, the upper link arms are formed of a pair of telescopic parts 82 and 84 respectively. The telescopic part 82 includes a shaft portion 85 which is welded to a pair of plates 86 having a first pivot or pin member 89 having an axis 87 connected thereto with a movable portion or sleeve 90 of the pivot member 89 surrounding the same and being connected to he second pivot member or sleeve 88 by welding and defining a second pivot axis normal to the axis 87 of pivot member 89. The pivot member 89 or shaft 89 is welded or otherwise secured to the plates 86 and with the journaling sleeve 90 defines a first pivot structure for part 82. The sleeve 88 of a second pivot structure has an axis which is normal to the sleeve 90 of the first pivot structure, and the sleeve 88 mounts the pivot pin, indicated at 92, which couples this end of the pivot arm 82 to a flange member 94 on the wheel mounting flange 40. Shaft portion 85 also includes an ear or key member 95 extending therefrom at the opposite extremity remote from the plates 86 for purposes to be later noted. The telescopic part 84 includes a plate member 96 which is welded to a sleeve member 97 fitted over the shaft portion 85 of the telescopic part 82 and slidable thereon. The plate 96 and a flange 110, also welded to sleeve member 97, mount a pin 99 which has positioned over the same a sleeve 100 forming a pivot 101, the sleeve 100 being welded to a sleeve 105 defining a second pivot normal to the pivot axis 101. These dual pivots form knuckle joints at the ends of the telescopic parts 82, 84, and as will be seen in FIGS. 1 and 2, a pin 106 is positioned through the sleeve 105 to pivotally connect the telescopic arm part 84 to the implement. The telescopic parts 82, 84 are allowed to slide relative to one another, that is, the sleeve member 97 will slide relative to the shaft portion 85 and the key 95 on the shaft portion 85 will limit the separation of the telescopic parts in an extended direction while the sleeve member 97 bearing against the plates 86 of the telescopic part 82 will restrict movement of the telescopic in a collapsed or shortened position. With each of the upper link arms 80 coupled at the telescopic part 82 to the tractor through a horizontal pivot axis defined by the pins 92, and sleeves 88, the pivot axis for the link arms is defined which is generally parallel to the pivot axis of the lower push arms. Similarly, the opposite telescopic parts 84 extending from the link arms on either side of the tractor or vehicle wheels will be connected to the implement through a horizontal pivot defined by the pins 106 and sleeves 105 which are also parallel to the pivot axis of the lower push arms. The individual link arms 80 include a second pivot axis at either end of the same normal to this horizontal pivot axis at the extremities of the link arms forming the knuckle joints at each end of the same and defining generally vertical pivot axes permitting the implement as carried by the upper link arms 80 to oscillate or move with a horizontal component of motion as will be hereinafter defined.

The lower push arms 52 also include a flange 120 which serve as a pivotal mounting for cylinder portion 121 of a lift cylinder 122 whose shaft extremity 123 is pivotally connected to the flange 110 of the telescopic parts 84 in the upper link arms 80. The lift cylinders, as will be hereinafter noted, provide for elevating the implement to a transport position.

Figure 6:
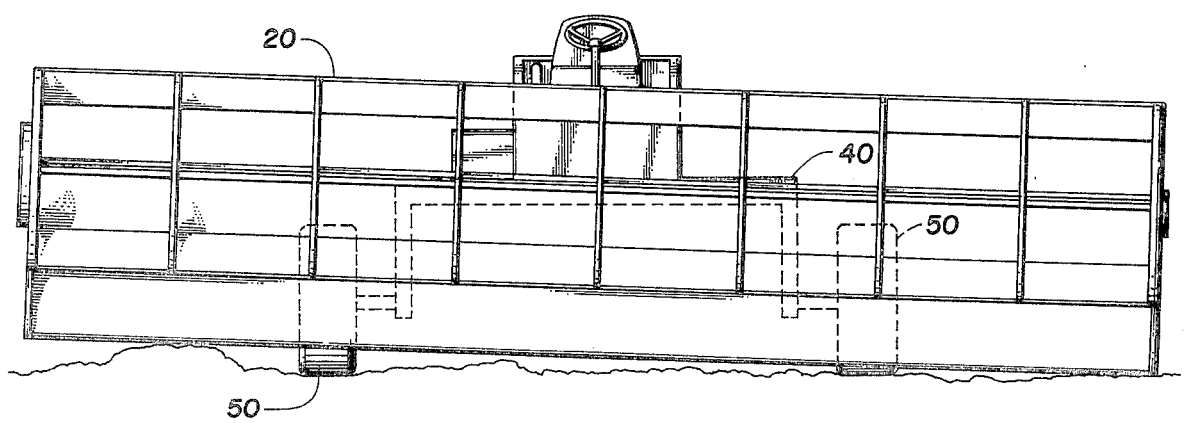
FIG. 6 is a schematic front elevation view of the implement in an oscillated position relative to the support vehicle similar to FIG. 3 with the left side raised to show tilting of the implement.

In the operation of the improved mounting support system, the implement and support vehicle when standing on level ground and in a working position will have the upper link arms contracted. This is due to the fact that the center of gravity of the implement or header is behind the lift point of the lower push arms 52. If the center of gravity is ahead of the lift point of the lower push arms, the upper link arms will be extended. In the transport position as seen in FIG. 2, the lift cylinders will be fully extended, causing the implement to raise on the pivot arms 52 as the shaft portion 123 of the lift cylinders extend lifting or raising the outer extremities of the upper link system or the telescopic parts 84 and hence, the implement to which they are attached. The lift cylinders are mounted such that they provide a sufficient forward pressure on the upper link arms to cause them to fully extend and with such extension, provide a solid link for rigidity and transport of the implement. As seen in FIGS. 3 and 6, the implement is in an oscillated position or tilted position with one edge thereof higher than the other to simulate traversing on uneven terrain. Thus, as best shown in FIG. 6, with the implement raised on the left side, the upper left link arm will be extended and the right link arm will be contracted. With such raising of the left side of the implement, it is necessary that the left upper link arms move horizontally toward the right. Thus, the header or implement 20 is basically rotating about the lower right side of the implement. The oscillation described is effected by the left side of the header lifting generally straight up, but due to the linkage system the header also moves slightly backward on one side thereof. This is due to the fact that the upper link arms 80 are considerably shorter than the lower push arms 52 and if the upper link arms 80 are solid, the implement would tend to twist when only one side was lifted, tending to damage or place an undue strain on the same. However, since the header or implement 20 is solid such oscillation is prohibited and the upper link arms 80 by telescoping allow the implement to come generally vertically upward, or nearly so. Sufficient play in the lower pivot points allow for minor translational movement other than about the pivot axis, but the shorter upper link arms 80 are provided with vertical pivots at either extend of the same to prevent a twisting movement of being applied thereto. The parts of the upper link arms 80 limit the amount of telescoping or extension or retraction and the knuckles or dual pivots at either ends of the same allow for horizontal movement of the header and greater oscillation of the header with respect to the support vehicle for traversing on uneven terrain.

Where it is desired to provide a solid upper link, a suitable aperture 130 (see FIGS. 4 and 5) is provided in the sleeve part 97 with a similar aperture in the solid shaft 85 so that a pin may be positioned therein and restrict telescopic movement of these parts. The improved mounting system provides for a four point linkage system in which the upper support arms are telescopic and dual pivoted to provide for sufficient play in the system to eliminate deformation of the implement which is mounted thereby.

What I claim is:

1. A mounting system adapted to mount an implement on one end of a tractor comprising, a pair of fixed lower arm members pivotally connecting the implement to the tractor at a lower portion of the implement and the tractor, a pair of upper arm members for pivotally connecting the tractor to the implement at an upper portion of the implement and the tractor, said pivotal connections between the upper and lower arms and the implement and the tractor being in a horizontal plane and generally parallel to one another, said upper arm members being telescopic and each include a second pivot whose axis is normal to the pivot axis of the arms in the horizontal plane, spring means connected between the implement at the lower portion thereof and the tractor at an upper portion thereof, and means connected between the upper and lower arm members to raise the implement relative to the tractor.

2. The mounting system of claim 1 in which the lower arm members have a fixed length greater than the upper arm members in an extended condition and in which the upper and lower arm members are connected respectively between the implement and the tractor on either side of the same.

3. The mounting system of claim 1 in which the upper arm members are formed of a pair of telescopic parts each having a knuckle joint at the extremities of the same.

4. The mounting system of claim 3 in which the telescopic parts forming the upper arm members each includes stop means for limiting the extension and retraction of the telescopic parts relative to one another.

5. The mounting system of claim 1 in which the spring means is a pair of tension springs connected between the tractor on either side thereof and the implement on the sides thereof to maintain position of the implement relative to the tractor in a working relationship therewith.

6. The mounting system of claim 5 in which the means connected between the upper and lower mounting arms to raise the implement relative to the tractor include a pair of hydraulic actuators pivotally connected at one extremity to the lower mounting arms and at the other extremity to the upper mounting arms and operative in an extended position to elevate the implement clear of the ground for transport purposes.

7. The mounting system of claim 6 in which the upper and lower arm members on either side of the tractor and implement respectively move independent of one another and the upper arm members extend to permit elevation of one side of the implement with irregular terrain independent of movement of the other side of the implement.

* * * * *